June 24, 1930.  E. O. BARSTOW ET AL  1,768,282
POWDERED METALLIC CHLORIDE AND METHOD OF MAKING SAME
Filed Aug. 30, 1928
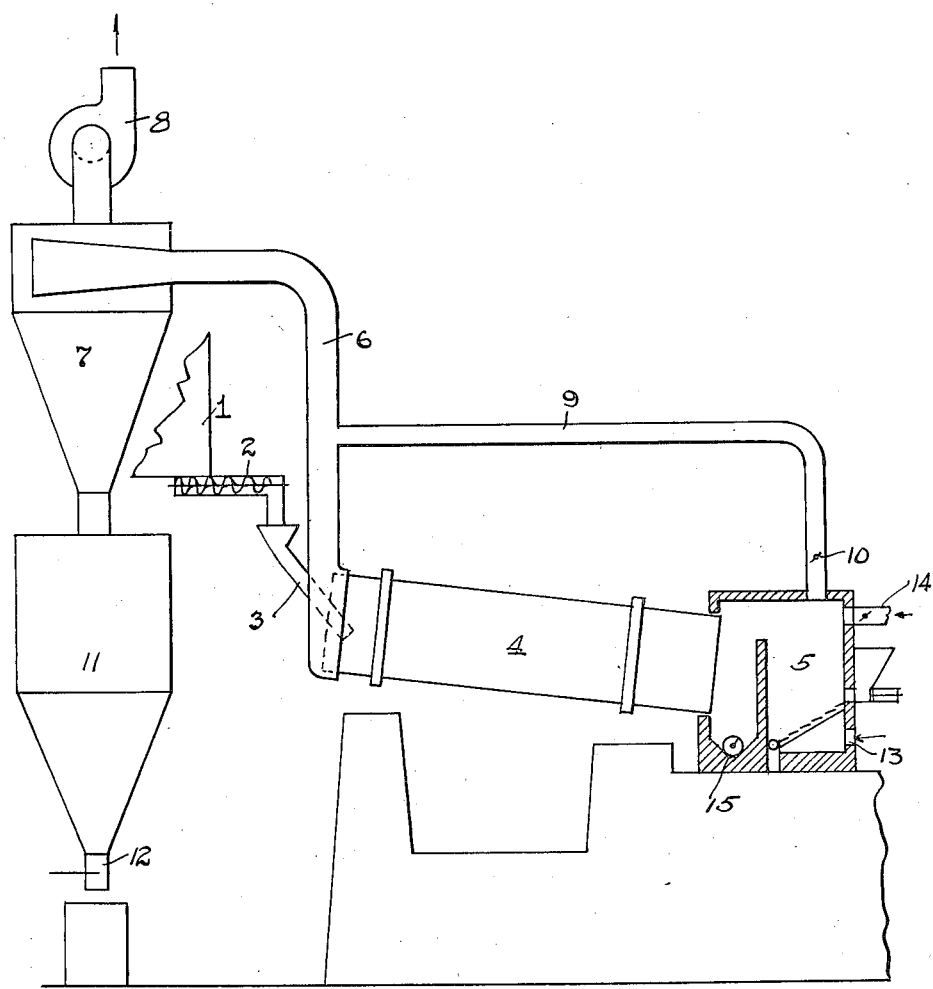
INVENTOR.
Edwin O. Barstow 2nd
BY Sheldon B. Heath
Fay, Oberlin & Fay
ATTORNEYS.

Patented June 24, 1930

1,768,282

UNITED STATES PATENT OFFICE

EDWIN O. BARSTOW AND SHELDON B. HEATH, OF MIDLAND, MICHIGAN, ASSIGNORS TO THE DOW CHEMICAL COMPANY, OF MIDLAND, MICHIGAN, A CORPORATION OF MICHIGAN

POWDERED METALLIC CHLORIDE AND METHOD OF MAKING SAME

Application filed August 30, 1928. Serial No. 302,946.

Calcium chloride has been produced in quantity in a free-flowing, non-caking granular or flaked form, the particles having been superficially dried in accordance with U. S. Patent No. 1,527,121, issued to Paul Cottringer and William R. Collings, and/or treated in accordance with U. S. Patent 1,592,971, issued to Herbert H. Dow.

A product of the same general character but in the form of non-caking, free-flowing powder has desirable qualities, one being the promptness with which it will enter solution in water. Such a product is highly desirable for incorporation in cement mixtures since the time element for entering into solution is very brief as compared with that required to dissolve the coarser flake or granular form. The problem in hand is to produce economically such a product.

We have found that if a granular or flaked form of the chloride be dried in a current of hot gases while being agitated in a manner to abrade same, the gases leaving the dryer will carry in suspension a finely divided chloride having non-caking, free-flowing characteristics and comprising dried particles of small size containing less water than that corresponding to the average of the chloride in the dryer. We have found further that by separating such powder from the exit gases in the manner hereinafter detailed, a new product having the desirable qualities above noted is readily obtained.

To the accomplishment of the foregoing result, the invention, then, consists of the steps and product hereinafter fully described and particularly pointed out in the claims, the annexed drawing illustrating one typical form of apparatus adapted for the carrying out of such steps, such disclosed apparatus illustrating, however, but one of the various ways in which the principle of the invention may be used.

In said annexed drawing:—

The single figure there appearing illustrates in diagrammatic fashion an apparatus for carrying out our improved process or method, and its application to production of powdered calcium chloride will be explained.

1 is a source of granulated, broken or flaked calcium chloride which may take the form of a granulator, a flaker or a storage for a divided form of the chloride, e. g., a bin containing such material. As illustrated in the drawing, the material from 1 is fed by means of screw conveyor 2 into the feed spout 3 of a rotary cylindrical dryer 4 which may be set in an inclined position as shown. A furnace 5 is connected with the discharge end of dryer 4 and is shown in the drawing fitted for the combustion of solid fuel in a mechanical stoker. An exit duct 6 is fitted to the other or feed end of the dryer 4 and delivers into a centrifugal separator 7, connected with an exhauster 8, to induce a draft of gases through the apparatus. A by-pass duct 9 connects the furnace 5 with the exit duct 6 and is shown fitted with a damper 10 for controlling the flow of gases therethrough. A receiver 11 provided with a gated outlet 12 at the lower end is fitted to the separator 7. Primary air for combustion is indicated as entering beneath the fuel bed at 13 and there is further provided at 14, a dampered inlet for air above the fuel bed.

In the operation of the above described apparatus fuel is burned in the furnace 5 and the products of combustion are drawn through the dryer 4, the duct 6 and separator 7, from which they are discharged by the exhauster 8. By the means of the damper 14 excess air may be admitted for controlling the temperature of the gases entering the dryer 4. The material to be dried, e. g., flake or granular hydrated calcium chloride containing conveniently approximately 73 per cent to 75 per cent $CaCl_2$, is fed into the dryer in a uniform and controlled stream. The dryer is rotated and the solid material flowing therethrough is brought into counter current relation with the hot products of combustion and becomes dried or superficially dried. By controlling the temperature of the gases entering the dryer to the approximate range of 400° to 475° C. and the rate of working to reduce that temperature at the exit to approximately 100° C., the disadvantageous phenomenon of sweating may be avoided as pointed out by Cottringer and Collings. The coarse particles will fall out of the dryer at the lower end onto conveyor 15. The fine particles will be suspended in the gaseous current and will be drawn out therewith through the duct 6. The gaseous current leaving the dryer will, however, contain the water which has been extracted from the material being dried in the dryer and under economic working conditions may have a temperature of approximately 100° C. Its humidity would in some cases interfere with the separation of the dust in a dry form in the separator 7. We therefore in cases where found necessary or advisable mix with the gaseous current leaving the dryer, carrying its burden of dust particles, hot gases which we preferably obtain from the furnace by way of by-pass 9. The amount introduced is regulated to a minimum which will secure efficient operation of the separator and a satisfactory character of product. We have found that if sufficient hot gases be introduced to raise the temperature of the exist gas stream from 100° C. to 130° C., satisfactory working and product is secured. The dust or powdered calcium chloride separates out in the separator and drops into the receiver below from which it may be withdrawn and packaged or otherwise handled as desired. The cleaned gas stream is discarded by the exhauster 8. We have found that operating as above described and producing a dried flaked product leaving the conveyor 15, analyzing from 78 to 80 per cent $CaCl_2$, there is obtained a dry, free-flowing calcium chloride powder in receiver 11 analyzing from 80 to 82 per cent $CaCl_2$, which product has a fine white appearance and is admirably suited to certain uses in the arts.

The hot powder may be cooled in one of several ways before packaging, if desired. It may be passed over or in proximity with a heat absorbing surface or it may be cooled by drawing over or through it preferably while being slowly stirred a controllable and limited current of cooler air or gas at a velocity too low to pick up the particles.

By suitably adjusting the inclination of the dryer 4 to regulate the time of drying relative to the output and by further providing the dryer with shelves or shovels, the portion of the product fed which will be converted into powder may be varied, which provisions enable the production of a greater or larger percentage of the dried product in the form of powder as may be required. By introducing into the dryer elements such as rakes, drags, jackstones, pebbles, rollers, etc. calculated to increase the abrasive action, substantially the entire output may be had in powdered form. By arranging the shovels and other internal fittings of the dryer to exert the least abrasive action possible, the production of powder may be reduced to a minimum.

Other forms of dryer than that shown may be used, it being sufficient to provide for a suitably intimate contact between the hot gas stream and the chloride being dried to insure an economic absorption of the heat of the fuel. The counter current relation is desirable particularly where the major portion of the product is desired in the form of superficially dried flakes or grains. In case it is not desired to produce a dried flake or granular product, the dryer may take the form of a disintegrater or attrition device in which the chloride fed is brought into contact with the hot gas stream while being abraded. An alternative procedure would be to return the oversize dried product leaving the dryer as by conveyor 15 to the feed spout 3 for recirculation through the combined drying and abrasion step. A still further alternative would be to reduce the gas inlet into the dryer to a diameter substantially less than that of the body of the dryer so as to retain in same the oversize particles until they are either reduced to powder and carried out in the gas stream or the discharge of such oversize particles is minimized to the desired extent.

There are various ways in which the humidity if excessive of the gas stream carrying the powdered chloride may be reduced so as to permit separation of same in a dry form. Such suggested alternatives involve the use of heating devices to supply heat to the gas stream either by radiation or convection or both, but we have found it satisfactory and economical to reduce the humidity by mixing hot gases, preferably of low humidity, with the gas stream carrying the hot particles. Such gases are economically derived from the products of combustion of fuel in the furnace by by-passing same around the drying step.

Instead of introducing heat or a heated or other gas current into the gas stream carrying the suspended product, we may, in some cases, prefer to lag, jacket, or otherwise protect the duct and separator and even the exhauster and receiver from excessive heat loss, thereby restricting the rise in humidity of the gas stream to a humidity at which it would not lose water to the product or to surfaces to which the product might adhere.

It is obviously sufficient in any case to maintain the humidity below that at which the gas stream will lose appreciable water.

The powdered form of calcium chloride obtained by the herein disclosed method whether it represent a portion or all of the chloride supplied to the process, is in the form of finely divided, dried particles of hydrated chloride having free-flowing characteristics and exhibiting a reduced tendency to cake in the package.

It has a fine appearance, enters water solution promptly, far more so than does the coarser flake or granular form, making it admirably fitted for any use requiring putting into solution. It exhibits further the valuable property of self-sealing a leak in its container or package. When an impervious container, i. e., bag, can, drum or the like is perforated and the content exposed to moist air, it will permeate or diffuse through a large volume of granular or flake form of hygroscopic salt damaging perhaps the entire package contents, whereas we find that the powdered form absorbs water so promptly that a sealing paste forms promptly adjacent to the perforation and practically stops at least for ordinary periods of storage entrance of further moisture to the larger portions of the contents of the package, restricting the damage to a small portion at the point of perforation or leak.

The method is applicable to the drying of other hygroscopic chlorides of metals of group II and particularly of magnesium chloride, and may be practiced, in general, with hygroscopic salts capable of reduction to powder by attrition or abrasion in a current of hot gases.

Although we have described the particles of the powdered product as dried, we would point out that the product particles being in part derived from abrasion of the drier exterior coating of superficially dried larger particles and in part being the remnant of such superficially dried larger particles after reduction in size to that at which they will be suspended in the aeroform current, these product particles may be comprised in part of hydrated salt of a uniform composition, and in part of hydrated salt having an exterior drier than the interior thereof. They do, however, all possess the property of having been dried to a water content below the normal crystal water content.

We would point out further the obvious variation which may be secured in the size of the air separated particles of which the product is composed by varying the air or gas current velocity. The higher the velocity of the current, the larger the particles that will be carried out of the drying zone into the separator and, conversely, the slower the current, the finer the particles. It is obvious that by making suitable modifications in the cross section of the dryer path, changes in temperature and drying effected, and such like, desired variations in size of and dryness of particles in the product may be secured.

We would again further point out that other separators than the centrifugal type shown may be used such as bags or the like which are available in form adapted for continuous use being provided if desirable with automatic shakers and the like for removing the powder deposited in same.

We would still further point out that our method may be employed to recover a valuable powdered form of hydrated hygroscopic salt as a by-product in working the Cottringer-Collings process, or by augmenting the abrasive action as hereinbefore described it may be employed to produce such powdered form as the principal product.

By adjusting the drying and abrading factors it is obvious that the particles comprising the powder may be dried completely or as far as desired short of complete dehydration. Such procedure applied to the form of apparatus herein disclosed may involve setting the dryer horizontally, restricting the rate of feed, raising the temperature of the gas current, and by-passing more heat or a larger volume of hot gas to effect part of the dehydration of the fine particles while in suspension beyond the abrading zone.

Since it is practicable to flake or otherwise prepare in divided form calcium chloride having an analysis approximating 71% anhydrous salt and to superficially dry such form of salt according to the Cottringer-Collings disclosure, we may obtain a powdered form of such chloride by our method analyzing as low as 73% $CaCl_2$.

Other forms may be employed embodying the features of our invention instead of the one here explained, change being made in the form of construction, provided the elements stated by any of the following claims or equivalent of such stated element be employed, whether produced by our preferred method or by others embodying steps equivalent to those stated in the following claims.

We therefore particularly point out and distinctly claim as our invention:—

1. The method of preparing a powdered form of metallic salt containing water of crystallization and normally having a hygroscopic character, said powdered form exhibiting free-flowing characteristics and a reduced tendency to cake in the package, which includes the steps of superficially drying a coarser form of said salts while abrading therefrom finer particles, suspending said finer particles in an aeroform current and separating the so-suspended particles therefrom.

2. The method of preparing a powdered form of metallic salt containing water of crystallization and normally having a hygroscopic character, said powdered form exhibiting free-flowing, non-caking characteristics and a reduced tendency to cake in the package, which includes the steps of superficially drying a coarser form of said salts in contact with a hot aeroform current while abrading therefrom finer particles, suspending said finer particles in said aeroform current and separating the so-suspended particles therefrom.

3. The method of preparing a powdered form of metallic salt containing water of crystallization and normally having a hygroscopic character, said powdered form exhibiting free-flowing, non-caking characteristics and a reduced tendency to cake in the package, which includes the steps of superficially drying a coarser form of said salts in a current of heated gases derived from the combustion of fuel while abrading therefrom finer particles, suspending said finer particles in said current of gases and separating the so-suspended particles therefrom.

4. The method of preparing a powdered form of metallic salt containing water of crystallization and normally having a hygroscopic character, said powdered form exhibiting free-flowing non-caking characteristics and a reduced tendency to cake in the package, which includes the steps of abrading coarse particles of said salt while being dried in a hot aeroform current, suspending the fine particles thereby produced in said aeroform current and separating the so-suspended particles therefrom.

5. The method of preparing a powdered form of a metallic salt containing water of crystallization and normally having a hygroscopic character, said powdered form exhibiting free-flowing, non-caking characteristics and a reduced tendency to cake in the package, which includes the steps of abrading coarse particles of said salt while drying same in a hot aeroform current, suspending the fine particles so abraded in said current, and separating the so-suspended particles of salt therefrom while maintaining the humidity of said current below that at which it will lose appreciable water.

6. The method of preparing a powdered form of metallic salt containing water of crystallization and normally having a hygroscopic character, said powdered form exhibiting free-flowing, non-caking characteristics and a reduced tendency to cake in the package, which includes the steps of abrading coarse particles of said salt while being dried in a hot aeroform current, suspending the fine particles so abraded in said current, reducing the humidity of said aeroform current beyond the drying zone and separating the so-suspended particles of salt from the mixed current so formed.

7. The method of preparing a powdered form of metallic salt containing water of crystallization and normally having a hygroscopic character, said powdered form exhibiting free-flowing, non-caking characteristics and a reduced tendency to cake in the package, which includes the steps of abrading coarse particles of said salt while being dried in a hot aeroform current, suspending the fine particles so abraded in said current, reducing the humidity of said current beyond the drying zone by mixing therewith a hot aeroform current of lower humidity and separating the so-suspended particles of salt from the mixed current so formed.

8. The method of preparing a powdered form of calcium chloride containing water of crystallization said powdered form exhibiting free-flowing, non-caking characteristics and reduced tendency to cake in the package, which includes the steps of superficially drying a coarser form of said chloride while abrading therefrom fine particles, suspending said fine particles in an aeroform current and separating the so-suspended particles therefrom.

9. The method of producing a powdered form of calcium chloride containing water of crystallization said powdered form exhibiting free-flowing, non-caking charteristics and reduced tendency to cake in the package, which includes the steps of superficially drying a coarser form of said chloride containing approximately 71 to 75 per cent $CaCl_2$ while abrading therefrom fine particles, suspending said fine particles in an aeroform current and separating the so-suspended particles therefrom.

10. The method of producing a powdered form of calcium chloride containing water of crystallization said powdered form exhibiting free-flowing, non-caking characteristics and reduced tendency to cake in the package, which includes the steps of superficially drying a coarser form of the chloride containing approximately 71 to 75 per cent $CaCl_2$ in a current of heated gas while abrading from said coarser particles fine particles, suspending said fine particles in said current of gas, and separating the so-suspended particles therefrom while maintaining the humidity of said current below that at which it will lose appreciable moisture.

11. The method of producing a powdered form of calcium chloride containing water of crystallization said powdered form exhibiting free-flowing, non-caking characteristics and reduced tendency to cake in the package, which includes the steps of superficially drying a coarser form of the chloride containing approximately 71 to 75 per cent $CaCl_2$ in a current of heated gas while abrading from said coarser particles fine particles, suspending said fine particles in said current of gas, reducing the humidity of the gaseous current carrying said particles and then separating the so-suspended particles therefrom.

12. The method of producing a powdered form of calcium chloride containing water of crystallization said powdered form exhibiting free-flowing, non-caking characteristics and reduced tendency to cake in the package, which includes the steps of superficially drying a coarser form of said chloride in a current of gas of gradually increasing temperature within the range between 100° C. and 475° C. while abrading from said particles fine particles, suspending said fine particles in said gas current, withdrawing same from the drying zone, and separating the so-suspended particles therefrom while maintaining the humidity of said current below that at which it will lose appreciable moisture.

13. As a new article of manufacture, a metallic chloride in the form of a fine air separated powder containing water of crystallization and having a hygroscopic character.

14. As a new article of manufacture, a metallic chloride containing water of crystallization and having a hygroscopic character, such chloride being in the form of dried particles forming a powder which has been air separated from a coarser form of the chloride.

15. As a new article of manufacture, calcium chloride containing water of crystallization such chloride being in the form of a finely divided air separated powder said particles analyzing not less than 73 per cent of the anhydrous salt.

16. In methods of separating a hygroscopic solid from suspension in an aeroform current, the step which consists in maintaining the humidity of the aeroform current while in contact with said solid such that the latter will not take up water therefrom by mixing therewith another aeroform current.

17. In methods of separating a hygroscopic solid from suspension in an aeroform current, the step which consists in mixing therewith another aeroform current of lower relative humidity thereby maintaining the humidity of the aeroform current while in contact with said solid such that the latter will not take up waters therefrom.

18. In methods of separating a hygroscopic solid from suspension in an aeroform current, the step which consists in mixing therewith another aeroform current of relatively lower humidity and higher temperature thereby maintaining the humidity of the aeroform current while in contact with said solid such that the latter will not take up water therefrom.

19. As a new article of manufacture, a metallic chloride in the form of a fine air separated powder containing water of crystallization and having a hygroscopic character separated as a by-product in the drying of a coarser form of said chloride.

20. In methods of drying a hydrated form of metallic salt, the step which consists in dividing the dried product into two portions one of which is air separated from the other, the former having a lower water content than the latter.

21. In methods of drying a hydrated form of metallic salt, the steps which consist in feeding a coarse form thereof to a drying zone, and removing therefrom separately a finely divided air separated portion and a coarser portion thereof, the former having a lower water content than the latter.

Signed by us this 16 day of August, 1928.

EDWIN O. BARSTOW.
SHELDON B. HEATH.